United States Patent
Chen et al.

(10) Patent No.: US 10,199,647 B2
(45) Date of Patent: Feb. 5, 2019

(54) OXYFLUORIDE COMPOUNDS FOR LITHIUM-CELLS AND BATTERIES

(71) Applicant: KARLSRUHER INSTITUT FUER TECHNOLOGIE, Karlsruhe (DE)

(72) Inventors: Ruiyong Chen, Karlsruhe (DE); Shuhua Ren, Eggenstein-Leopoldshafen (DE); Sylvio Indris, Eggenstein-Leopoldshafen (DE); Maximillian Fichtner, Oftersheim (DE); Horst Hahn, Seeheim-Jugenheim (DE)

(73) Assignee: KARLSRUHER INSTITUT FUER TECHNOLOGIE, Karlsruhe (DE)

(*) Notice: Subject to any disclaimer, the term of this patent is extended or adjusted under 35 U.S.C. 154(b) by 56 days.

(21) Appl. No.: 15/125,702

(22) PCT Filed: Mar. 19, 2015

(86) PCT No.: PCT/EP2015/055832
§ 371 (c)(1),
(2) Date: Sep. 13, 2016

(87) PCT Pub. No.: WO2015/140264
PCT Pub. Date: Sep. 24, 2015

(65) Prior Publication Data
US 2017/0005332 A1   Jan. 5, 2017

(30) Foreign Application Priority Data
Mar. 20, 2014 (EP) .................... 14160894

(51) Int. Cl.
| | |
|---|---|
| *H01M 4/485* | (2010.01) |
| *H01M 10/0525* | (2010.01) |
| *H01M 4/62* | (2006.01) |
| *C01G 31/02* | (2006.01) |
| *C01G 37/02* | (2006.01) |
| *C01G 37/04* | (2006.01) |
| *C01G 39/02* | (2006.01) |
| *C01G 39/04* | (2006.01) |
| *C01G 41/02* | (2006.01) |
| *C01G 41/04* | (2006.01) |
| *C01G 31/00* | (2006.01) |
| *C01G 37/00* | (2006.01) |
| *C01G 39/00* | (2006.01) |
| *C01G 41/00* | (2006.01) |
| *H01M 10/052* | (2010.01) |
| *H01M 4/02* | (2006.01) |

(52) U.S. Cl.
CPC .......... *H01M 4/485* (2013.01); *C01G 31/006* (2013.01); *C01G 37/006* (2013.01); *C01G 39/006* (2013.01); *C01G 41/006* (2013.01); *H01M 4/625* (2013.01); *H01M 10/0525* (2013.01); *C01P 2002/52* (2013.01); *C01P 2002/54* (2013.01); *C01P 2002/72* (2013.01); *C01P 2004/64* (2013.01); *C01P 2006/40* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 6,677,082 B2 | 1/2004 | Thackeray | |
| 6,680,143 B2 | 1/2004 | Thackeray | |
| 2009/0253042 A1* | 10/2009 | Sun ........................ | H01M 4/136 429/231.95 |
| 2009/0297947 A1* | 12/2009 | Deng ................... | H01M 4/0471 429/231.95 |
| 2010/0086854 A1* | 4/2010 | Kumar ................... | H01M 4/505 429/223 |
| 2011/0244331 A1* | 10/2011 | Karthikeyan ........... | C01G 51/50 429/223 |

FOREIGN PATENT DOCUMENTS

JP    H0733443 A    2/1995

OTHER PUBLICATIONS

Chang Keun Back et al., "Electrochemical Properties and Gas Evolution Behavior of Overlithiated Li2NiO2 as Cathode Active Mass for Rechargeable Li Ion Batteries", 7 pgs, Journal of the Electrochemical Society,159 (6) A887-A893, 2012.
Natasha A.Chernova et al., "Layered vanadium and molybdenum oxides: batteries and electrochromics", Journal of Materials Chemistry, vol. 19, 2009, pp. 2526-2552.
Yang Li. et al., "Structural and magnetic properties on F-doped LiVO2 with two-dimensional triangular lattice", Mater. Res. Soc. Symp. Proc., vol. 1344, 2011, pp. 145-150.
Zhong et al., J. Electrochem. Soc. 1997, 144, pp. 205-213.
T. Ohzuku et al., Chem. Lett. 2001, 30, pp. 642-643.
Thackeray et al, J. Mater. Chem. 2005, 15, pp. 2257-2267.
Chernova et al., J. Mater. Chem. 2009, 19, pp. 2526-2552.
Delmas et al., Solid State Ion. 1994, 69, pp. 257-264.
Hu et al., Angew. Chem. Int. Ed. 2009, 48, pp. 210-214.
Pistoia et al, J. Electrochem. Soc. 1985, 132, pp. 281-284.
Picciotto et al., Solid State Ion. 1993, 62, pp. 297-307.
Pralong et al., Chem. Mater. 2012, 24, pp. 12-14.
Amatucci et al., J. Fluorine Chem. 2007, 128, pp. 243-262.
Li et al., Mater. Res. Soc. Symp. Proc. vol. 1344, 2011, pp. 145-150.

(Continued)

Primary Examiner — Katie L. Hammer
(74) Attorney, Agent, or Firm — Abel Law Group, LLP

(57) ABSTRACT

The present invention concerns specific new compounds of formula $Li_{(2-x)}Na_{(x)}MO_{(2-y/2)}F_{(1+y)}$ (where $0 \leq x \leq 0.2$ and $-0.6 \leq y \leq 0.8$ and M is a transition metal), cathode material comprising the new compounds, batteries and lithium-cells comprising said new compound or cathode material, a process for the production of the new compound and their use.

20 Claims, 2 Drawing Sheets

(56) References Cited

OTHER PUBLICATIONS

Poizot et al,, Nature 2000, 407, pp. 496-499.
Islam et al., J. Mater. Chem. 2011, 21, pp. 9811-9818.
Nishimura et al., J. Am. Chem. Soc. 2010, 132, pp. 13596-13597.
Melot et al., Am. Chem. Res. 2013, 46, pp. 1226-1238.
Goodenough et al., J. Am. Chem. Soc. 2013, 135, pp. 1167-1176.

* cited by examiner

ОХYFLUORIDE COMPOUNDS FOR LITHIUM-CELLS AND BATTERIES

BACKGROUND OF THE INVENTION

1. Field of the Invention

The present invention concerns specific new compounds, cathode material comprising the new compounds, batteries and lithium-cells comprising said new compound or cathode material, a process for the production of the new compound and their use.

2. Discussion of Background Information

Rechargeable lithium ion batteries will play an essential role for future sustainable electrochemical energy storage strategy. The key challenges for future high-energy and/or high-power automotive applications as well as for large-scale stationary energy storage systems are high performance electrode materials.

State-of-the-art commercial cathode materials such as $LiCoO_2$, $LiFePO_4$, $LiMn_2O_4$ and $LiMn_{1.5}Ni_{0.5}O_4$ have low capacity of lower than 170 mAh/g and low energy density of lower than 500 Wh/kg (Melot et al, Acc. Chem. Res. 2013, 46, 1226; Goodenough et al., J. Am. Chem. Soc. 2013, 135, 1167; Zhong et al., J. Electrochem. Soc. 1997, 144, 205.)

Layered cathode materials $LiCo_{1/3}MN_{1/3}O_2$ (referred to as NMC) with higher capacity of 190 mAh/g have been developed. (T. Ohzuku et al., Chem. Lett. 2001, 30, 642.) A further optimization performed at the Argonne National Laboratory leads to high capacity (250 mAh/g) lithium-manganese-rich NMC composite cathodes. (U.S. 66/677, 082 and U.S. Pat. No. 6,680,143; Thackeray et al, J. Mater. Chem. 2005, 15, 2257).

This high-capacity cathode material suffers from voltage fading at higher current rates and capacity fading upon high voltage (up to 4.9 V) cycling. Higher capacity cathode materials are desirable for many commercial applications. Vanadium-based materials have received considerable attention for lithium (ion) batteries due to the facts that (i) vanadium is cheap and abundant, (ii) vanadium has relatively low atomic mass, (iii) vanadium has multiple oxidation states and the redox operating voltage (typically <4.5 V) of vanadium-based materials is typically within the stability limit of conventional electrolyte, and (iv) vanadium oxides have rich crystal structures (Chernova et al., J. Mater. Chem. 2009, 19, 2526).

The ability of layered $V_2O_5$ for $Li^+$ insertion has been well characterized. Intercalation of one $Li^+$ per formula unit corresponds to a specific capacity of 147 mAh/g.

Further $Li^+$ ions (X>1 in $Li_xV_2O_5$) insertion causes irreversible structural transformations (Delmas et al., Solid State Ion. 1994, 69, 257).

In addition, the voltage plateaus for the $V^{5+}/V^{4+}$ and $V^{4+}/V^{3+}$ redox reactions occur successively during $Li^+$ intercalation-extraction processes (Hu et al., Angew. Chem. Int. Ed. 2009, 48, 210). This successive redox couples cause complications in designing battery systems.

Layered $LiV_3O_8$ is capable of storing reversibly two additional $Li^+$ per formula unit, involving only $V^{5+}/V^{4+}$ redox couple (Pistoia et al, J. Electrochem. Soc. 1985, 132, 281). Rock-salt structure $Li_4V_3O_8$ appears when further lithiation proceeds, which causes deterioration in the rechargeability (Picciotto et al., Solid State Ion. 1993, 62, 297).

Recently, a lithium-rich $Li_2VO_3$ vanadate with rock-salt structure has been reported with excellent cyclability and a specific capacity of 253 mAh/g by utilizing $V^{5+}/V^{4+}$ redox couple reactions (Pralong et al, Chem. Mater. 2012, 24, 12). This material was obtained by electrochemical lithiation of a monoclinic $LiVO_3$.

One disadvantage of the above mentioned vanadium-based materials (vanadium oxides, lithium vanadates) is that they are restricted for a one-electron reaction per transition metal. Another disadvantage is that most of the materials require lithium source from anode side and thus make industrial use difficult.

Fluorine-doped materials have been applied in energy storage in order to improve the material performance and stability through surface fluorination and bulk doping (by substitution fluorine for oxygen in oxide-based materials). Fluorine-doped materials exhibit intrinsic stability in electrochemical system, such as the practical use of fluorine-based electrolytes and binders. Owing to the extraordinary electronegativity of fluorine, the M (metal)-F bonds have higher ionicity than the M-O bonds. Fluorinated $LiMO_2$, NMC, phosphates and spinel $LiMn_2O_4$ have thus been developed and shown enhanced electrochemical performances. (Amatucci et al., J. Fluorine Chem. 2007, 128, 243.)

The structural and magnetic properties of F-doped LiVO2 ($LiVO_{2-x}F_x$ with x=0; 0,1; 0,2 and 0,3)) have been characterized by Li et al. (Mater. Res. Soc. Symp. Proc. Vol. 1344, 2011). The use of lithium containing metal-halogen oxide as active material of a positive electrode was disclosed in JP H07 343 A.

Intercalation cathode materials enabling beyond one $Li^+$ storage per transition metal are attractive and competitive for Li-ion batteries in comparison with conversion cathodes (high capacity, but low work voltage and relatively poor cyclability) (Poizot et al, Nature 2000, 407, 496). To date, polyanion-type intercalation cathodes $Li_2MSiO_4$ silicates (Islam et al, J. Mater. Chem. 2011, 21, 9811) and $Li_2MP_2O_7$ pyrophosphates (Nishimura et al., J. Am. Chem. Soc. 2010, 132, 13596) have attracted tremendous attention in view of two-electron reaction and higher lithiation voltage. However, practical electrochemical performance of these materials shows that only one $Li^+$ capacity can be obtained for Fe-based compounds and Mn-based materials suffer from server Jahn-Teller distortion.

In conclusion the prior art electrode materials exhibit various drawbacks and disadvantages.

Therefore, it has been the object of the present invention to provide new compounds for electrode materials, new cathodic materials, new batteries and/or lithium cells and new methods for manufacturing these subjects matter which no longer exhibit the drawbacks and disadvantages of the prior art set out about above.

In particular, the new compounds should be suitable as high performance electrode materials.

A further object of the invention was to provide batteries and/or lithium cells which allows the use of a broad range of anode materials, in order to adapt the anode material to the needed requirements. The new cathode material has to be compatible with the other materials of the cells or batteries.

A further object was to provide a method for the production of such an electrode material. The method should be easily accessible and allow the production of electrodes in high quantities and for industry scale applications.

Additionally, the battery materials should exhibits commonly improved Li storage performance as compared to the state-of-the-art.

High performance electrode materials are defined according to the invention as materials being suitable as electrode materials with high-capacity (>150 mAh/g), high current rate (>5.0 mA/g), high energy density (>500 Wh/kg) and/or current rate of at least 5 mA/g. In case of rechargeable devices a high cycling stability (at least 10 galvanostatical charge/discharge cycles). These features should be present at standard room temperature (25° C.) as well as at lower or higher temperatures (+40° C.).

SUMMARY OF THE INVENTION

Accordingly a new compound of formula (I): $Li_{(2-x)}Na_{(x)}MO_{(2-y/2)}F_{(1+y)}$ with $0 \leq x \leq 0.2$ and $-0.6 \leq y \leq 0.8$ and M is a transition metal has been found. This compound shows improved characteristics of high performance electrode materials.

In one embodiment the subject matter of the present invention is a compound of formula (II): $Li_{(2-x)}Na_{(x)}MO_{(2-y/2)}F_{(1+y)}$ with $x=0$ and $y=0$ and M is a transition metal.

In a further embodiment a compound of formula (III): $Li_{(2-x)}Na_{(x)}MO_{(2-y/2)}F_{(1+y)}$ with with $x=0.1$ and $y=0$ and M is a transition metal has been found.

In one alternative of the formulas (I), (II) and/or (III) M is in a trivalent oxidation state.

In one alternative the metal M is vanadium, chromium, tungsten or molybdenum or a mixture thereof, preferably vanadium or molybdenum or chromium or a mixture thereof, especially vanadium or chromium.

In one embodiment the metal M is vanadium.

In an other embodiment the metal M is chromium.

Subject matter of the present invention is also a process for the production of a compound according to the invention including the step of milling the inorganic precursors of the compound according to the invention.

According to the present invention the inorganic precursors are selected from the following groups:
(a): Lithium containing compounds selected from the group comprising or consisting of: $Li_2O$, LiF and $Li_2CO_3$.
(b): Compound containing a transition metal which is able to achieve a trivalent oxidation state selected from the group of comprising or consisting of: $V_2O_3$, $MoF_3$, $MoHal_3$, $Mo_2O_3$, $Mo_2S_3$, $WCl_3$, $Cr_2O_3$, $VF_3$ and $VHal_3$,(with Hal=Cl, Br or I).
(c): Compound comprising fluoride selected form the group consisting or comprising of: LiF, NaF, KF, $CaF_2$, fluoride salts like $CrF_3$, $SbF_3$, $AlF_3$, $BeF_2$, $MgF_2$, $SrF_2$, $PbF_2$, AgF and HgF.

Where appropriate (d) a compound comprising Na selected from the group comprising or consisting of: NaF, $Na_2CO_3$, NaHal (with Hal=Cl, Br or I), sodium salt like $NaSO_4$, $NaNO_3$.

Where appropriate (e) an oxide selected from the group comprising or consisting of metal oxides, preferably transition metal oxides as mentioned in group (b).

In one alternative the inorganic precursors are selected from the above mentioned groups (a) to (e) so that only elements as represented in the compound of formula (I) are present, e.g. LiF, $Li_2CO_3$ and/or $Li_2O$, NaF, $Na_2CO_3$ (whereby $CO_2$ is released) and/or $Na_2O$, transition metal oxide or transition metal fluoride. In an other alternative the inorganic precursors are selected from the above mentioned groups (a) to (e) so that only elements as represented in the compound of formula (I) are present, e.g. LiF, $Li_2CO_3$ and/or $Li_2O$, transition metal oxide or transition metal fluoride.

In case that insertion and/or intercalation of further elements is desired, any respective compound of the groups (a) to (e) can be used.

In a further alternative the inorganic precursors are selected from lithium-, fluorid-, M- and oxygen-comprising compounds.

One embodiment is directed to inorganic precursors selected from the group of LiF, $Li_2O$, $V_2O_3$ and if applicable NaF and/or $Na_2CO_3$. A further embodiment is directed to inorganic precursors selected from the group of LiF, $Li_2O$, $Cr_2O_3$ (and if applicable NaF and/or $Na_2CO_3$).

In one embodiment in the process of the present invention Lithium compounds are added to transition metal compounds so that the molar ratio of Lithium to transition metal is from 4:1 to 1:2, preferably 1.8:1 to 1:2, more preferably 2:1.

In another alternative precursors are used in the process of according to the invention so that the molar ratio of lithium to oxygen is from 1.8:2.3 to 2:1.6, preferably 1:1.

In a further alternative the ratio of lithium to oxygen can be 2:1.6.

The fluorine to oxygen ration can be adjusted within the claimed range. Furthermore, the lithium can be partially replaced by sodium.

Thus, the material performance can be altered by the chemical composition.

In a further alternative inorganic precursors are used so that lithium is up to 20 excess, preferably 10%, especially 5%.

In one alternative a mechanical milling is performed.

In one alternative a mechanical ball-milling is performed.

In one embodiment of the invention high energy ball-milling is performed.

The precursors are milled according to the process of the present invention at 300:600 RPM, preferably 400:500 RPM, more preferably at 450 RPM for at least 10 hours, preferably for 10 to 72 hours, more preferably 20 to 50 hours.

In a further embodiment of the process according to the invention the milling step is performed under inert atmosphere. In one embodiment the milling step is performed in a gas-tight container in a argon-filled glove box.

The crystallite size of the product of the milling is about 3 to 15 nm, preferably 5 to 14 nm, more preferably 6 to 12, below 10, especially 8 to 10 nm, 9 nm.

A further embodiment of the present invention is directed to a cathode material comprising one of the above mentioned compounds. In one alternative the cathode material comprises the compound of the invention and carbon black, preferably in a ratio of 8:0.5 to 1:2, more preferably of 4:1.

In one embodiment of the present invention the product of the milling process, the compound of the invention is mixed with carbon black in a ratio of compound of the invention to carbon black from 8:0.5 to 1:2, preferably of 4:1.

In one alternative the mixing is carried out by a milling process, preferably a ball milling process. The milling is performed at 100 to 300 rpm, preferably 200 rpm for about 3 to 10 hours, preferably 4 to 8, more preferably 5 hours.

The product of this process is a cathode material for a battery and/or lithium cell.

In one embodiment the compound of the invention is used as cathodic material. The material is produced as disclosed above.

In a further embodiment of the invention the compound of the invention or the above disclosed cathodic material are used in batteries and/or lithium cells.

One embodiment of the invention is directed to a battery and/or a lithium cell comprising the compound of the invention or the above disclosed cathodic material of the invention.

The battery and/or a lithium cell of the invention are characterized by a specific capacity of 150 to 500 mAh/g, preferably of 200 to 500, more preferably of 300 to 450 mAh/g, especially 400 mAh/g.

In one embodiment this high, above mentioned specific capacity is a reversible discharge capacity.

The discharge voltage is about 2 to 3 V, preferably 2.5 V.

Thus, in one alternative the battery or the lithium cell of the invention is characterized by a energy density of 300 to 1.200 Wh/kg, preferably 600 to to 1.200 Wh/kg, especially up to 1.000, preferably 1.000 Wh/kg.

The battery or the lithium cell of the invention has a current rate of 5 to 9, preferably 6 to 8, more preferably 7-7.5 mA/g in a temperature range of 20-50° C., preferably 25-40° C.

The battery and/or lithium cell of the invention have as counter electrode a electrode comprising or consisting of a material selecting from the group of: lithium, carbon materials, carbon, metal, alloy or oxide, Si , preferably a counter electrode comprising or consisting of lithium.

As electrolyte the battery and/or lithium cell of the invention, has an electrolyte comprising or consisting of a material selected from the group of: 0.7 M lithium bis (oxalato)borate in ethylene carbonate/diethyl carbonate (7:8 w/w), lithium hexafluorophophate ($LiPF_6$) in ethylene carbonate, dimethyl carbonate , preferably 0.7 M lithium bis (oxalato)borate in ethylene carbonate/diethyl carbonate (7:8 w/w).

In comparison with the prior art, several remarkable advantages of this new compound are: (i) two-electron reaction based on M3/M5 is accessible per transition metal, (ii) the initial composition is at lithiated state, (iii) it has an impressively high theoretical specific capacity of 462 mAh/g and experimentally, up to 400 mAh/g reversible discharge capacity has been achieved.

The average discharge voltage is about 2.5 V. Thus, the energy density (up to 1000 Wh/kg) and/or the capacity are much higher than those for the state-of-the-art commercial cathode materials.

Furthermore, in comparison with the start-of-the-art commercial cathode materials, this new material exhibits much higher capacity and energy density. It also shows excellent cycling stability.

The lithium-containing inorganic oxyfluoride according to the invention is able to store reversibly large amount of lithium ions with a two-electron redox reaction of the transition metal M.

The crystallite size of the compound of the invention is below 10 nm. This nanocrystalline character of battery materials exhibits improved Li storage performance.

The lithium-containing cathode materials of the invention provide lithium source from itself for lithium ion batteries and/or lithium cells. Thus, a broad range anode materials can be used for the assembly of full cell.

DETAILED DESCRIPTION OF EMBODIMENTS OF THE INVENTION

EXAMPLES

Example 1

0.5188 g LiF, 0.298 8 g $Li_2O$ and 1.499 g $V_2O_3$ powders were mixed together, placed in a gas-tight container in an argon-filled glovebox and subsequently ball-milled at 450 rpm for 50 h to obtain $Li_2VO_2F$.

Figure 1:
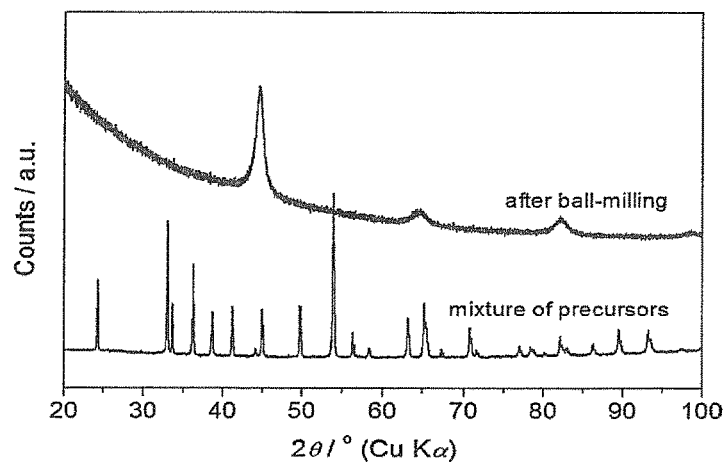
FIG. 1 Powder X-ray diffraction patterns of synthesized $Li_2VO_2F$ after ball-milling and mixture of starting precursors according to Example 1.

FIG. 1 shows the X-ray diffraction patterns for the starting mixture and ball-milled $Li_2VO_2F$. The sharp diffraction peaks from the starting precursors disappeared and new phase with broad diffraction peaks were formed after ball-milling. The crystallite size is about 9 nm, calculated by Scherrer equation.

As-obtained $Li_2VO_2F$ powders were mixed with carbon black (4:1 w/w) by ball-milling at 200 rpm for 5 h.

Electrochemical tests were performed using a Swagelok-type half-cell setup using lithium as counter electrode, two sheets of glass fiber as separator and 0.7 M lithium bis (oxalato)borate in ethylene carbonate/diethyl carbonate (7:8 w/w) as electrolyte.

Figure 2:
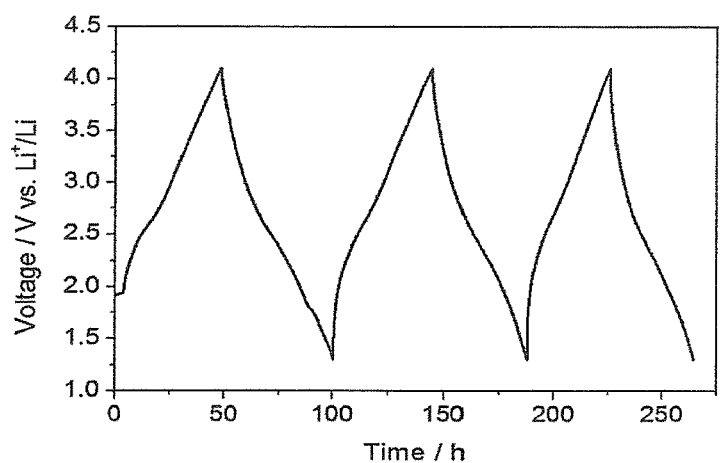
FIG. 2 Electrochemical charge/discharge voltage versus time for $Li_2VO_2F$ using lithium as counter electrode measured between 4.1 and 1.3 V at a current rate of 7.7 mA/g at 40° C. according to Example 1.

FIG. 2 shows the galvanostatic charge/discharge performance tested between 1.3 and 4.1 V versus lithium at a current rate of 7.7 mA g' at 40° C. The initial discharge capacity was 400 mAh g1.

$Li_2VO_2F$ shows excellent performance over further cycling.

Example 2

0.4928 g LiF, 0.2838 g $Li_2O$, 0.0420 g NaF, 0.0530 g $Na_2CO_3$ and 1.499 g $V_2O_3$ powders were mixed together, placed in a gas-tight container in an argon-filled glovebox and subsequently ball-milled at 450 rpm for 24 h to obtain $Li_{(1.9)}Na_{(0.1)}VO_2F$.

As-obtained $Li_{(1.9)}Na_{(0.1)}VO_2F$ powders were mixed with carbon black (4:1 w/w) by hand-grinding. Eletrochemical tests were performed using the similar procedure as described in Example 1.

Figure 3:
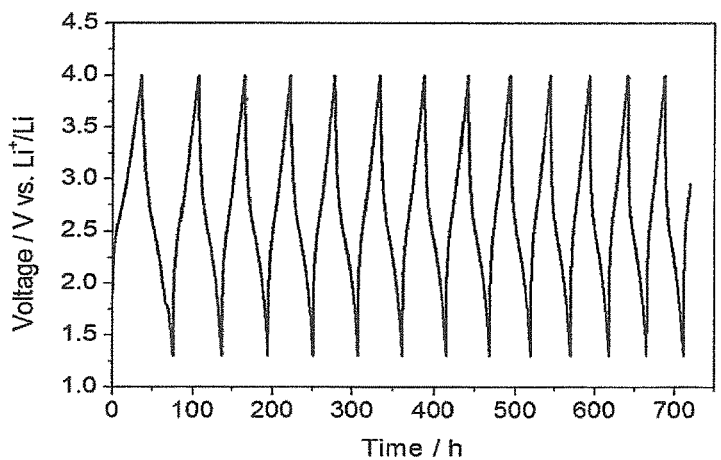
FIG. 3 Electrochemical charge/discharge voltage versus time for $Li_{(1.9)}Na_{(0.1)}VO_2F$ using lithium as counter electrode measured between 4.0 and 1.3 V at a current rate of 7.23 mA/g at 25° C. according to Example 2.
Figure 4:
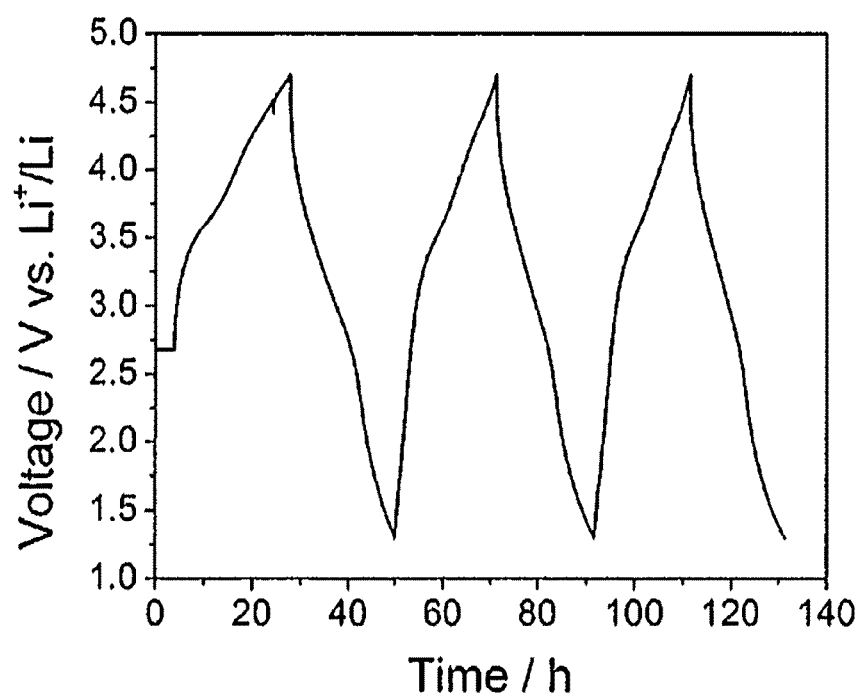
FIG. 4 Electrochemical charge/discharge voltage versus time for $Li_2CrO_2F$ using lithium as counter electrode measured between 4.7 and 1.3 V at a current rate of 15.4 $mAg^{-1}$ at 40° C. according to Example 4. The initial discharge capacity was 340 $mAhg^{-1}$.

FIG. 3 shows the galvanostatical charge/discharge performance tested between 1.3 and 4.0 V versus lithium at a current rate of 7.23 mA/g at 25° C.

The initial discharge capacity was 290 mAh g1. $Li_{(1.9)}Na_{(0.1)}VO_2F$ shows excellent cycling stability over further cycling.

Example 3

0.9805 g LiF, 0.06 125 g $Li_2O$ and 1.499 g $V_2O_3$ powders were mixed together, placed in a gas-tight container in an argon-filled glovebox and subsequently ball-milled at 450 rpm for 20 h to obtain $Li_2VO_{(1.6)}F_{(1.8)}$. As-obtained $Li_2VO_{(1.6)}F_{(1.8)}$ powders were mixed with carbon black (4:1 w/w) by ball-milling at 250 rpm for 4 h. Electrochemical tests were performed using the similar procedure as described in Example 1.

Galvanostatic charge/discharge was performed between 4.1 and .1.3 V versus lithium at a current rate of 7.17 mA/g at 40° C. The initial discharge capacity was 170 mAh/g.

Example 4

0.219 g LiF, 0.139 g Li$_2$O and 0.642 g Cr2O$_3$ powders were mixed together, placed in a gas-tight container in an argon-filled glovebox and subsequently ball-milled at 450 rpm for 30 h to obtain Li$_2$CrO$_2$F. As-obtained Li$_2$CrO$_2$F powders were mixed with carbon black (7:3 w/w) by ball-milling at 400 rpm for 10 h. Electrochemical tests were performed using a Swagelok-type half-cell setup using lithium as counter electrode, two sheets of glass fiber as separator and 1.0 M LiPF$_6$ in ethylene carbonate/dimethyl carbonate (1:1 v/v) as electrolyte.

The invention claimed is:

1. A compound of formula Li$_{(2-x)}$Na$_x$MO$_{(2-y/2)}$F$_{(1+y)}$, wherein M represents one or more of V, Mo, Cr, and W and 0≤x≤0.2 and −0.6<y<0.8.

2. The compound of claim 1, wherein x =0 and/or y =0.

3. The compound of claim 1, wherein x =0.1 and/or y =0.

4. The compound of claim 1, wherein M is in a trivalent oxidation state.

5. The compound of claim 1, wherein M represents V.

6. The compound of claim 1, wherein M represents Cr.

7. The compound of claim 2, wherein M represents V in a trivalent oxidation state.

8. The compound of claim 2, wherein M represents Cr in a trivalent oxidation state.

9. The compound of claim 3, wherein M represents V in a trivalent oxidation state.

10. The compound of claim 3, wherein M represents Cr in a trivalent oxidation state.

11. The compound of claim 2, wherein M represents one or more of V, Mo, Cr, W in a trivalent oxidation state.

12. The compound of claim 3, wherein M represents one or more of V, Mo, Cr, W in a trivalent oxidation state.

13. A cathode material, wherein the material comprises the compound of claim 1.

14. The cathode material of claim 13, wherein the material further comprises carbon black.

15. A battery and/or lithium cell which comprises the compound of claim 1.

16. The battery or lithium cell of claim 15, wherein the battery or lithium cell has a specific capacity of 150-500 mAh/g and/or an energy density of from 300 to 1,200 Wh/kg.

17. The battery or lithium cell of claim 15, wherein the battery or lithium cell further comprises a counter electrode comprising or consisting of lithium.

18. A process for the production of the compound of claim 1, wherein the process comprises milling inorganic precursors of the compound.

19. The process of claim 2, wherein the inorganic precursors are milled mechanically.

20. The compound of claim 2, wherein x =0 and y =0.

* * * * *